(12) United States Patent
Patterson

(10) Patent No.: US 7,650,714 B1
(45) Date of Patent: Jan. 26, 2010

(54) FISHEYE

(76) Inventor: Charles A. Patterson, 600 Animosa Dr., Durango, CO (US) 81301

( * ) Notice: Subject to any disclaimer, the term of this patent is extended or adjusted under 35 U.S.C. 154(b) by 313 days.

(21) Appl. No.: 11/221,598

(22) Filed: Sep. 7, 2005

Related U.S. Application Data

(60) Provisional application No. 60/607,504, filed on Sep. 7, 2004.

(51) Int. Cl.
*A01K 97/06* (2006.01)
(52) U.S. Cl. .................................................. 43/57.1
(58) Field of Classification Search ................. 43/57.1, 43/54.1, 1; 224/920; 269/907
See application file for complete search history.

(56) References Cited

U.S. PATENT DOCUMENTS

| | | | | |
|---|---|---|---|---|
| 2,120,571 A | * | 6/1938 | Reichenstein et al. | 312/237 |
| 2,541,760 A | * | 2/1951 | Harrison | 359/815 |
| 2,713,807 A | * | 7/1955 | Herbert | 359/801 |
| 2,734,299 A | * | 2/1956 | Masson | 289/17 |
| 2,859,994 A | * | 11/1958 | Whitlinger | 289/17 |
| 4,540,239 A | * | 9/1985 | Frankel | 359/802 |
| 6,382,490 B1 | * | 5/2002 | Divincenzo | 224/681 |

* cited by examiner

*Primary Examiner*—Kurt Rowan
(74) *Attorney, Agent, or Firm*—Allen A. Dicke, Jr.

(57) ABSTRACT

The body of the fisheye device is sized to be supported around the fisherman's neck and rest against his chest. The body carries a convex lens, a spinner hook for engaging and holding a fishing hook with the eye free. A visual panel is in the line-of-sight beyond the spinner hook and carries a surface which is visually appropriate to aid in tying the line through the eye of the fishing hook.

8 Claims, 3 Drawing Sheets ved with him while he is actively fishing.

FISHEYE

CROSS-REFERENCE

This application relies for priority on the pending application Ser. No. 60/607,504, filed Sep. 7, 2004.

BACKGROUND OF THE INVENTION

Fly fishermen, in particular, use very light fishing lines. As a consequence, the lines are sometimes broken by the hook engaging on a snag. The fisherman wants to quickly tie a new hook on the end of the line so that he can rapidly resume fishing. This is particularly important when fish are biting. In fly fishing, the hooks are small with small eyes. The line is light and is usually monofilament nylon or the like. There are several kinds of knots by which a fishing line can be attached to the eye of a hook. Each of these knots requires several turns for security in the knotting. It is very difficult to insert the end of the line through the eye of the hook, make the necessary turns and complete the knot when the fisherman is in a difficult environment such as standing next to or in a stream. Thus, it would be helpful in such a situation to have a device which improves the circumstances under which the hook is held, the eye and end of the line are seen and knotting is aided.

SUMMARY OF THE INVENTION

In order to aid in the understanding of this invention, it can be stated in essentially summary form that it is directed to a device to aid a fisherman to tie a hook on the end of a fishing line. The device includes structure to hold the hook with its eye available, a magnifying lens to aid in seeing the eye of the hook and a visual field positioned on the line-of-sight from the fisherman through the lens to the hook holder to improve visibility to the fisherman during tying. The device is portable so that it can be carried with the fisherman during his fishing activities.

It is thus a purpose and advantage of this invention to provide a device which aids in tying a fishing line to the eye of a hook, the device being portable so that it can be carried with the fisherman during his fishing activities and is used while the fisherman is standing.

It is a further purpose and advantage of this invention to provide a device which is foldable into a compact unit so that it can be carried during fishing and can be unfolded into a position where it is utilized for holding eye of the hook and seeing the hook for insertion of the line through the eye of the hook.

It is another purpose and advantage of this invention to provide a device which has a lower panel which serves as a visual backdrop while the fisherman is looking at the eye of the hook and the fishing line for the tying of a fishing line into the eye of the hook.

It is a further purpose and advantage of this invention to have a hook holder of such nature that the hook can be rotated when the line is inserted through the eye of the hook to aid in knotting.

It is another purpose and advantage of this invention to include a magnifying lens between the fisher-man's eye and the hook holder, with the visual field in the back to further enhance the visibility of the line and the eye of the hook.

It is a further purpose and advantage of this invention to place the visual field on the lower panel and position the lower panel so that it can act as a work surface to temporarily hold such items as hooks.

It is another purpose and advantage of this invention to provide a device which can be folded when the hook tying is complete so that it is of convenient size to be worn around the neck of the fisherman, or otherwise carried with him while he is actively fishing.

Other purposes and advantages of this invention will become apparent from a study of the following portion of the specification and the attached drawings.

DESCRIPTION OF THE PREFERRED EMBODIMENT

Figure 1:
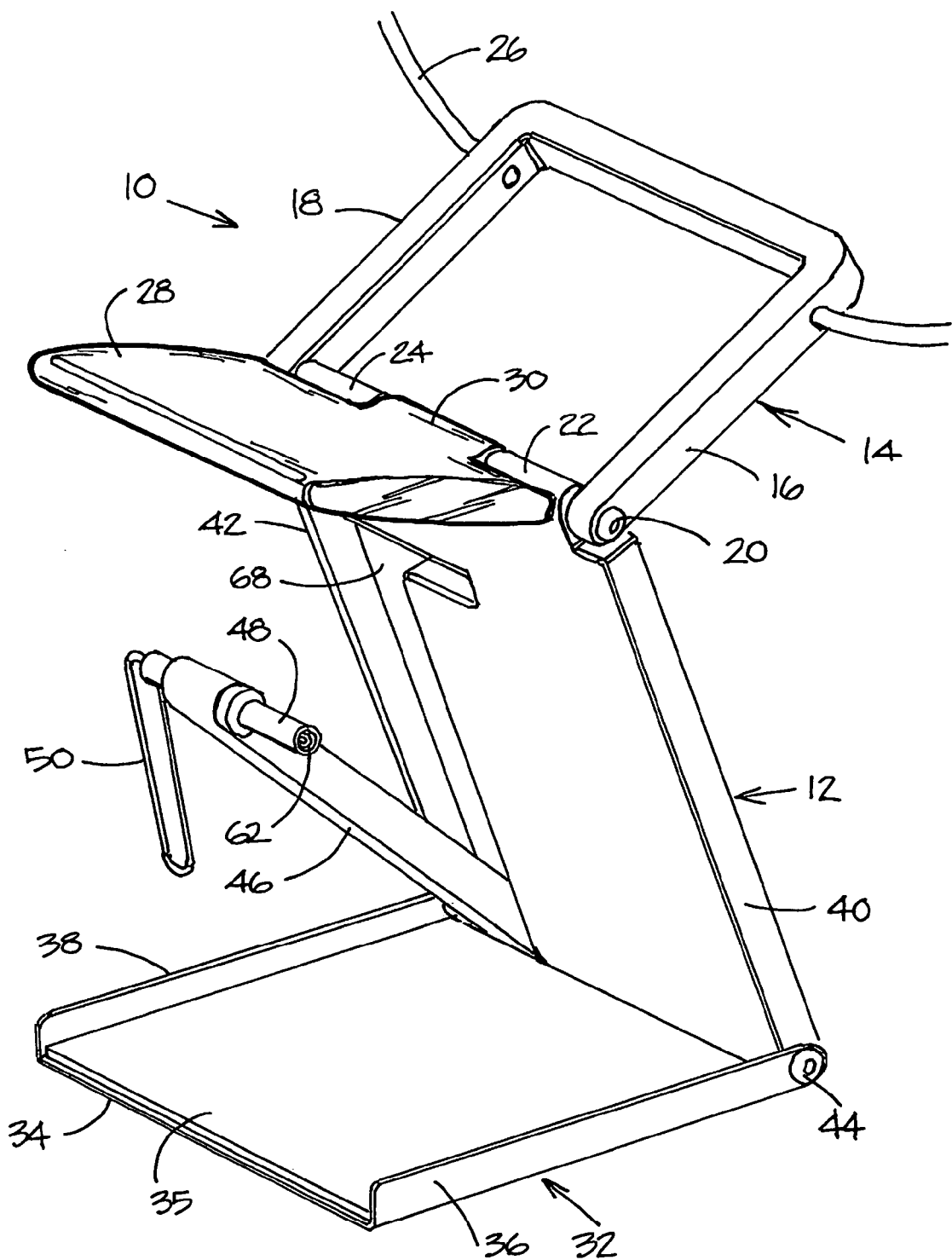
FIG. 1 is a perspective view of the fisheye device of this invention, shown from the fisherman's front and left.
Figure 2:
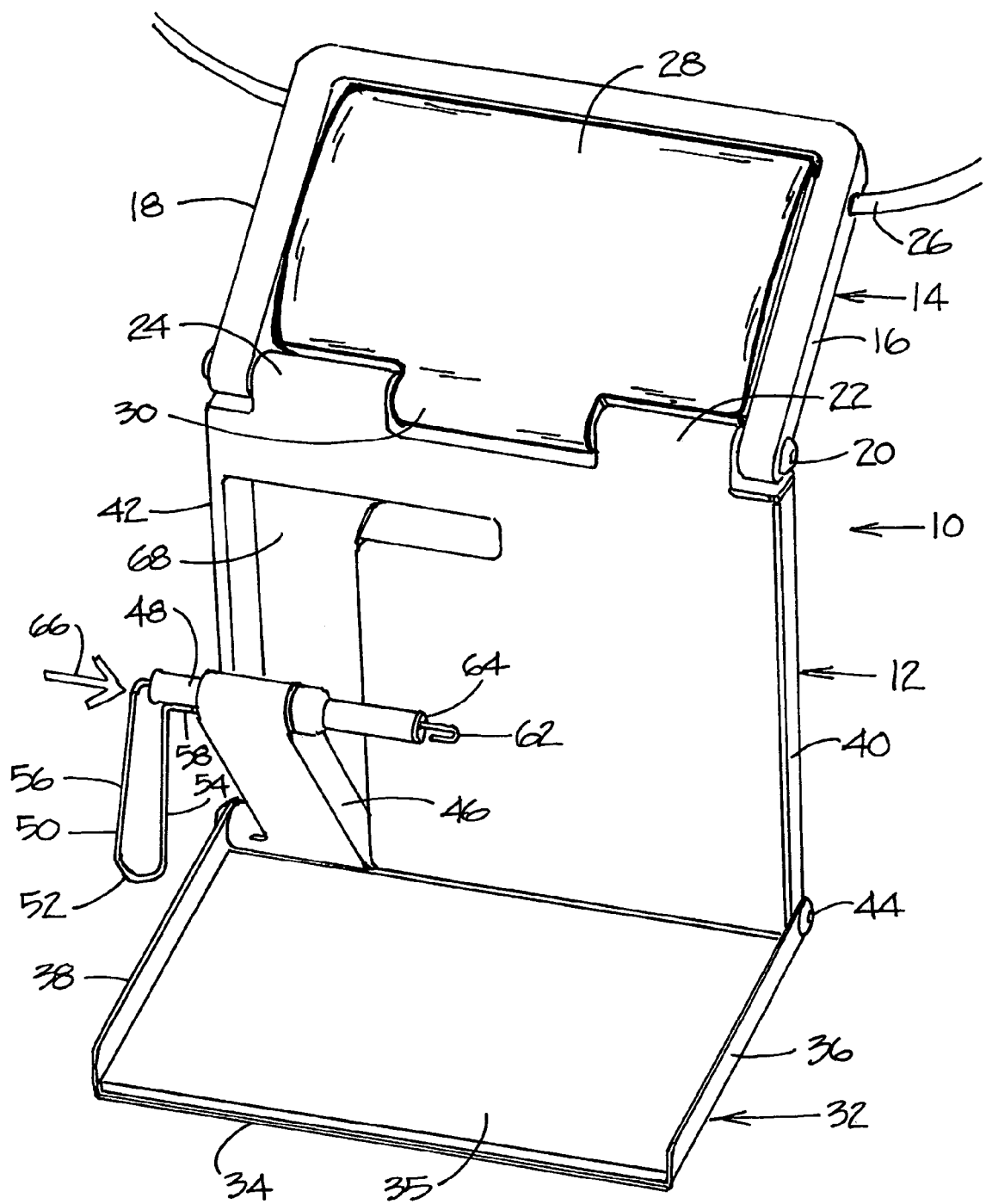
FIG. 2 is another perspective view of the fisheye device of this invention, also from the fisherman's front and left, but from a higher angle, with the lens folded up in a storage position.
Figure 3:
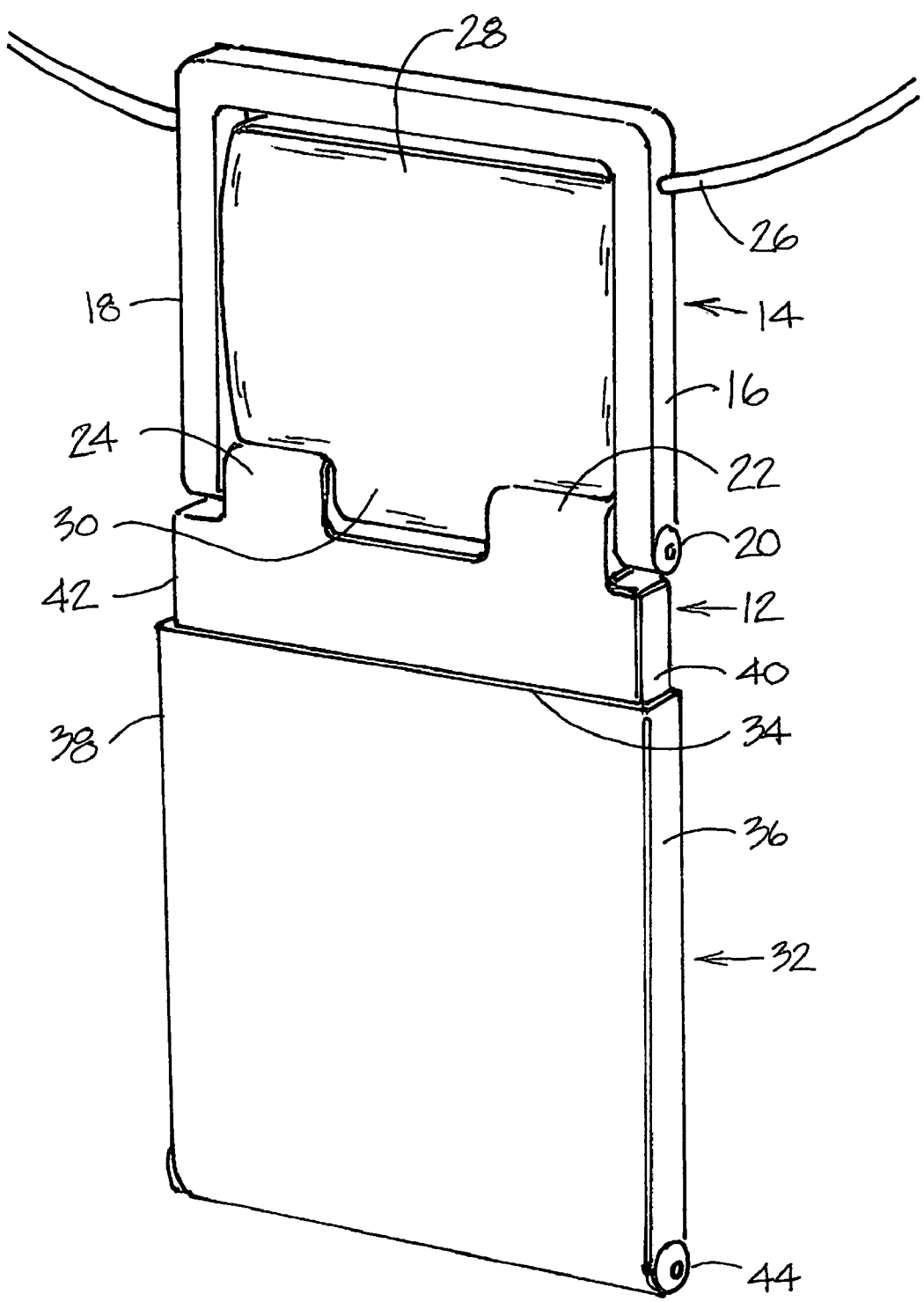
FIG. 3 is a perspective view similar to FIG. 1 showing the fisheye device is in the closed position.

The knot-tying device of this invention is generally indicated at 10 in FIGS. 1 and 2. The device comprises a substantially rectangular main body 12. U-shaped upper bracket 14 is attached at the top edge of the main body. The U-shaped upper bracket, formed of rectangular strap material, has left and right arms 16 and 18. The arms are pivoted on the top of the main body on shaft 20. Shaft 20 extends through the lower ends of the arms and through ears 22 and 24 extending upward from the main body. The left and right designations in this description are in the directions as seen by the fisherman when he is wearing the device around his neck.

Neck strap 26 extends through the upper top of the bracket 14, as seen in FIG. 1. The neck strap is long enough to engage around the neck of the fisherman and is long enough so that the main body 12 overlies the chest of the fisherman. The neck strap 26 and bracket 14 are holding structure which hold the body 12 against the fisherman when he is fishing. Pivoting of the bracket 14 on the body 12 is stiff so that the bracket can be placed in a particular angle or position with respect to the body, and it will remain in that position until significant force is used to adjust it to the new position. The angle at which the device will be used is close to that shown in FIG. 1. FIG. 1 also illustrates the operative configuration of the device.

Convex lens 28 has an ear 30 through which the shaft 20 passes. Thus, the convex lens can swing from a position where it is embraced within bracket 14, as seen in FIG. 2, to the extended, in-use position shown in FIG. 1. The lens is positioned so that it is in the fisherman's line-of-sight when he looks downward.

Tray 32 has a flat face 34 between left and right flanges 36 and 38. The flanges are separated enough so that they extend outside of the left and right edges 40 and 42 of the main body. Tray 32 is pivoted on the lower edge of the main body on pivot pin 44 so that it can swing up for storage. When not in use, the tray 32 is raised flat against the front of the body 12. The flat tray 32 carries panel 35 thereon which is finished in color and surface texture so that it serves as a suitable visual background. Panel 35 is held in place by a magnet and is reversible. One side is matte black for daytime use and the other side is glow-in-the-dark for use in the dark. It is the background the fisherman sees when he looks down through the lens 28. Proper background can enhance the fisherman's visibility of the fishing hook on which he is tying his line. In addition, the tray 32 and panel 35 serve a place where small parts such as a spare hook can be temporarily laid.

Spinner arm 46 is also pivoted on pivot pin 44. The upper end of spinner arm 46 carries spinner tube 48. The spinner tube 48 is rotatable in the arm 46. Spinner spring 50 is formed of a spring wire. It has a handle loop 52 which has legs 54 and 56. The spring leg 54 terminates in a yoke 58 which snaps onto the right end of tube 48. The leg 56 has a bend where it enters the right end of tube 48. The leg 56 extends through the tube 48 out past tube face 64 and terminates in spinner hook 62. The resiliency of the handle loop is sufficient to resiliently thrust the spinner spring leg 56 to the right to the point where the spinner hook 62 is retracted so that it is at least as far to the right as the face 64 of the spinner tube. Pressing on the spinner spring leg 56 in the direction of the arrow 66 causes the spinner hook 62 to be extended, as shown in FIG. 2, sufficiently to engage the hook of a fish hook in the spinner hook 62. Spinner hook 62 is the fishhook holding hook. Release of the leg 56 permits the spring to pull the fishhook against the face 64 to retain it for tying.

Spinner arm 46 is shown swung out to the active position in FIGS. 1 and 2 where the spinner hook is directly in the line-of-sight from the fisherman, through lens 28 and toward the visual field provided by the panel 35 on tray 34. The spinner arm 46 is rotatable on the pivot pin 44, and a pocket 68 is formed in the body to receive the arm, spinner tube 48 and handle loop 52 in the inactive position. The spinner arm is swung up into this pocket, and the tray 32 is raised to cover it in the inactive position. In the inactive position, the lens is swung up to where it is embraced by the bracket 14, as shown in FIG. 2.

As the fisherman is actively fishing, he is wearing the device 10 around his neck. It is in the closed position wherein the tray 32 is raised to cover the spinner arm, and the lens 28 is raised to the position where it is embraced by the upper bracket. The upper bracket may be adjusted with respect to the body for a comfortable fit for the fisherman's chest.

When the fisherman loses his hook, he opens the device by swinging out the tray 32, swinging out the spinner arm 46 and swinging out the lens 28. The fisherman takes a new hook, presses the spinner spring leg 56 to his left and engages the spinner hook 62 on the new hook. In this position, the eye of the hook is directed to the fisherman's left. He takes the end of the fishing line and inserts it through the eye of the fishing hook. His efforts are aided by the convex lens which provides a larger image and is aided by the favorable visual surface of the visual panel 35, which is behind the fishing hook in the fisherman's line-of-sight. Once the fishing line is inserted through the eye of the fishing hook, the fishing hook is rotated by spring 50 an appropriate number of turns. Then the free end is inserted back through an existing loop in the fishing line to form an appropriate knot. The excess free end can be snipped off. The fishing hook is released by thrusting the spinner spring to the left to the position shown in FIG. 2. The fishing hook is thus released from the spinner hook. The fisherman can fold up his device and promptly return to fishing.

This invention has been described in its presently preferred embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A fishhook holder comprising:
    a body;
    a spinner arm movably mounted on said body to move from a first, storage position to a second, active position, a fishhook-holding hook movably mounted on said spinner arm, said fishhook-holding hook being configured to releasably engage a fishhook for the tying of a fishing line thereto;
    a tray movably mounted on said body, said tray being movable from a first, storage position where it lies against said body and covers said spinner arm and fishhook-holding hook in its first position, to a second position where it is in a line-of-sight, said tray having a visible surface thereon;
    a convex lens movably mounted on said body from a first, stored position to a second, active position wherein said convex lens lies on a line-of-sight from the fisherman, through said convex lens and past said fishhook-holding hook to said visual tray surface, said visual tray being in visual contrast so as to enhance seeing of said fishhook-holding hook.

2. The fishhook holder of claim 1 wherein said spinner arm carries a spinner tube thereon, said spinner tube having a first wend and a second end, said fishhook-holding hook extending through said spinner tube, said fishhook-holding hook being resiliently mounted with respect to said spinner tube to resiliently retain a fishhook against said first end of said spinner tube, said fishhook-holding hook having structure which extends through said spinner tube and out of said second end of said spinner tube to be manually engageable to rotate said fishhook-holding hook with respect to said spinner tube.

3. The fishhook holder of claim 2 wherein said fishhook-holding hook extends out of said first end of said spinner tube and pulls the fishhook engaged on said fishhook-holding hook against said first end of said spinner tube.

4. The fishhook holder of claim 3 wherein said fishhook-holding hook and said structure are comprised of a single piece of bent resilient wire which engages on said second end of said spinner tube to urge said fishhook-holding hook into said first end of said spinner tube.

5. The fishhook holder of claim 1 wherein a bracket is mounted on said body and said convex lens moves from its first position where it lies next to said bracket to its second position wherein it lies on the line-of-sight.

6. The fishhook holder of claim 5 wherein said bracket has an open center and said convex lens lies within said bracket when it is in its first position.

7. The fishhook holder of claim 6 further including a neck strap attached to said bracket so that when said neck strap is engaged around a fisherman's neck, said fishhook holder lies against his chest and when said lens, tray and spinner arm are in their first position, the fisherman's vision is unobstructed but when they are in their second position, the fisherman can look downward along his line-of-sight through said convex lens to said fishhook-holding hook, with said tray as a background to enhance visibility.

8. A fishhook holder comprising:
    a body, a fishhook-holding hook movably mounted on said body to move from a first position to a second, active position;
    a tray movably mounted on said body to move from a first position wherein said tray lies against said body in its first position and encloses said fishhook holder in its first position between said tray and said body, to a second, active position, said tray having a panel thereon, said panel having first and second surface finishes thereon, said panel being interchangeable to position a selected surface finish to be visible on said tray; and
    holding structure on said body to permit a fisherman to hold said body against himself so that the fisherman's line-of-sight is past said fishhook-holding hook and said tray when both said fishhook-holding hook and said tray are in their first positions and out of the fisherman's line-of-sight.

* * * * *